United States Patent
Fritz et al.

(10) Patent No.: US 11,267,013 B2
(45) Date of Patent: Mar. 8, 2022

(54) PRINT HEAD HAVING A TEMPERATURE-CONTROL DEVICE

(71) Applicant: Dürr Systems AG, Bietigheim-Bissingen (DE)

(72) Inventors: Hans-Georg Fritz, Ostfildern (DE); Benjamin Wöhr, Eibensbach (DE); Marcus Kleiner, Besigheim (DE); Moritz Bubek, Ludwigsburg (DE); Timo Beyl, Besigheim (DE); Frank Herre, Oberriexingen (DE); Steffen Sotzny, Oberstenfeld (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 0 days.

(21) Appl. No.: 16/468,700

(22) PCT Filed: Dec. 1, 2017

(86) PCT No.: PCT/EP2017/081117
§ 371 (c)(1),
(2) Date: Jun. 12, 2019

(87) PCT Pub. No.: WO2018/108571
PCT Pub. Date: Jun. 21, 2018

(65) Prior Publication Data
US 2019/0314847 A1    Oct. 17, 2019

(30) Foreign Application Priority Data
Dec. 14, 2016   (DE) .................. 10 2016 014 943.4

(51) Int. Cl.
*B05B 13/04*   (2006.01)
*B05B 1/02*    (2006.01)
(Continued)

(52) U.S. Cl.
CPC ............ *B05B 13/0452* (2013.01); *B05B 1/02* (2013.01); *B05B 1/24* (2013.01); *B05B 1/3053* (2013.01);
(Continued)

(58) Field of Classification Search
None
See application file for complete search history.

(56) References Cited

U.S. PATENT DOCUMENTS

| 3,421,694 A | 1/1969 | Muller |
| 3,717,306 A | 2/1973 | Hushon et al. |

(Continued)

FOREIGN PATENT DOCUMENTS

| CN | 2287527 Y | 8/1998 |
| CN | 1331661 A | 1/2002 |

(Continued)

OTHER PUBLICATIONS

European Search Report for EP20170638.9 dated Sep. 14, 2020 (4 pages—English translation not available).
(Continued)

*Primary Examiner* — Binu Thomas
(74) *Attorney, Agent, or Firm* — Bejin Bieneman PLC (57) ABSTRACT

The disclosure relates to an application device for applying an application medium onto a component, preferably for application of a coating onto a motor vehicle body component. The application device includes a print head for preferably serial and/or permanent application of the application medium, wherein the print head has: a nozzle plate, at least one nozzle in the nozzle plate in order to discharge the application medium, at least one valve element, which is movable relative to the nozzle plate, for control of the application medium discharge through the at least one nozzle, wherein the at least one movable valve element
(Continued)

closes the at least one nozzle in a closing position and releases it in an opening position, and at least one drive for moving the at least one valve element. The application device is characterised in particular in that it includes at least one temperature control apparatus for reducing heating of the at least one drive during application of the application medium.

25 Claims, 7 Drawing Sheets

(51) Int. Cl.
| | |
|---|---|
| *B05B 1/24* | (2006.01) |
| *F16K 49/00* | (2006.01) |
| *B05C 5/02* | (2006.01) |
| *B05C 5/00* | (2006.01) |
| *B25J 11/00* | (2006.01) |
| *B41J 2/06* | (2006.01) |
| *B05B 1/30* | (2006.01) |
| *B05B 12/14* | (2006.01) |
| *F16K 31/00* | (2006.01) |
| *B05B 12/10* | (2006.01) |
| *B05C 11/10* | (2006.01) |
| *B41J 3/407* | (2006.01) |

(52) U.S. Cl.
CPC ............ *B05B 12/10* (2013.01); *B05B 12/149* (2013.01); *B05B 13/0431* (2013.01); *B05C 5/001* (2013.01); *B05C 5/0225* (2013.01); *B05C 5/0291* (2013.01); *B05C 11/1042* (2013.01); *B25J 11/0075* (2013.01); *B41J 2/06* (2013.01); *F16K 31/004* (2013.01); *F16K 49/005* (2013.01); *B41J 3/4073* (2013.01); *B41J 2202/08* (2013.01)

(56) References Cited

U.S. PATENT DOCUMENTS

| | | |
|---|---|---|
| 3,981,320 A | 9/1976 | Wiggins |
| 4,141,231 A | 2/1979 | Kudlich |
| 4,375,865 A | 3/1983 | Springer |
| 4,383,264 A | 5/1983 | Lewis |
| 4,423,999 A | 1/1984 | Choly |
| 4,430,010 A | 2/1984 | Zrenner et al. |
| 4,435,719 A | 3/1984 | Snaper |
| 4,478,241 A * | 10/1984 | Cardenas-Franco .... F16K 49/00 137/338 |
| 4,555,719 A | 11/1985 | Arway et al. |
| 4,668,948 A | 5/1987 | Merkel |
| 4,734,711 A | 3/1988 | Piatt et al. |
| 4,826,135 A | 5/1989 | Mielke |
| 4,894,252 A | 1/1990 | Bongen et al. |
| 4,941,778 A | 7/1990 | Lehmann |
| 4,974,780 A | 12/1990 | Nakamura et al. |
| 4,985,715 A | 1/1991 | Cypher et al. |
| 5,050,533 A * | 9/1991 | Zaber ................. B05C 11/1042 118/667 |
| 5,072,881 A | 12/1991 | Taube, III |
| 5,429,682 A | 7/1995 | Harlow, Jr. et al. |
| 5,435,884 A | 7/1995 | Simmons et al. |
| 5,538,221 A | 7/1996 | Joswig |
| 5,556,466 A | 9/1996 | Martin et al. |
| 5,602,575 A | 2/1997 | Pauly |
| 5,636,795 A | 6/1997 | Sedgwick et al. |
| 5,647,542 A | 7/1997 | Diana |
| 5,659,347 A | 8/1997 | Taylor |
| 5,681,619 A | 10/1997 | Ogasawara |
| 5,740,967 A | 4/1998 | Simmons et al. |
| 5,843,515 A | 12/1998 | Crum et al. |
| 5,951,882 A | 9/1999 | Simmons et al. |
| 5,964,407 A | 10/1999 | Sandkleiva |
| 5,976,343 A | 11/1999 | Schlaak |
| 6,179,217 B1 | 1/2001 | Yoshida et al. |
| 6,325,302 B1 | 12/2001 | Guzowski |
| 6,540,835 B2 | 4/2003 | Kim et al. |
| 6,607,145 B1 | 8/2003 | Boriani et al. |
| 6,641,667 B2 | 11/2003 | Ochiai et al. |
| 6,712,285 B2 | 3/2004 | Provenaz et al. |
| 6,777,032 B2 | 8/2004 | Ogasahara et al. |
| 6,811,807 B1 | 11/2004 | Zimmermann et al. |
| 6,849,684 B2 | 2/2005 | Poppe et al. |
| 7,160,105 B2 | 1/2007 | Edwards |
| 7,178,742 B2 | 2/2007 | Nellentine et al. |
| 7,182,815 B2 | 2/2007 | Katagami et al. |
| 7,244,310 B2 | 7/2007 | Edwards |
| 7,270,712 B2 | 9/2007 | Edwards |
| 7,357,959 B2 | 4/2008 | Bauer |
| 7,387,071 B2 | 6/2008 | Heinke et al. |
| 7,449,070 B2 | 11/2008 | Fellingham |
| 7,604,333 B2 | 10/2009 | Horsnell |
| 7,757,632 B2 | 7/2010 | Edwards |
| 7,837,071 B2 | 11/2010 | Achrainer |
| 7,901,741 B2 | 3/2011 | Katagami et al. |
| 8,028,651 B2 | 10/2011 | Rademacher et al. |
| 8,118,385 B2 | 2/2012 | Van De Wynckel et al. |
| 8,449,087 B2 | 5/2013 | Kataoka et al. |
| 8,545,943 B2 | 10/2013 | Frankenberger et al. |
| 8,652,581 B2 | 2/2014 | Merchant |
| 8,678,535 B2 | 3/2014 | Beier et al. |
| 8,875,655 B2 | 11/2014 | Pettersson et al. |
| 8,882,242 B2 | 11/2014 | Beier et al. |
| 9,108,424 B2 | 8/2015 | Wallsten et al. |
| 9,140,247 B2 | 9/2015 | Herre et al. |
| 9,156,054 B2 | 10/2015 | Ikushima |
| 9,266,353 B2 | 2/2016 | Beier et al. |
| 9,393,787 B2 | 7/2016 | Ikushima |
| 9,464,573 B2 | 10/2016 | Remy et al. |
| 9,592,524 B2 | 3/2017 | Fritz et al. |
| 9,701,143 B2 | 7/2017 | Ikushima |
| 9,707,585 B2 | 7/2017 | Reimert et al. |
| 9,844,792 B2 | 12/2017 | Pettersson et al. |
| 9,901,945 B2 | 2/2018 | Fehr et al. |
| 9,914,150 B2 | 3/2018 | Pettersson et al. |
| 10,016,977 B2 | 7/2018 | Stefani et al. |
| 10,105,946 B2 | 10/2018 | Nakamura et al. |
| 10,150,304 B2 | 12/2018 | Herre et al. |
| 10,252,552 B2 | 4/2019 | Pitz et al. |
| 10,272,677 B2 | 4/2019 | Stefani et al. |
| 10,532,569 B2 | 1/2020 | Wallsten et al. |
| 2001/0017085 A1 | 8/2001 | Kubo et al. |
| 2001/0019340 A1 | 9/2001 | Kubo et al. |
| 2002/0024544 A1 | 2/2002 | Codos |
| 2002/0043280 A1 | 4/2002 | Ochiai et al. |
| 2002/0043567 A1 | 4/2002 | Provenaz et al. |
| 2002/0105688 A1 | 8/2002 | Katagami et al. |
| 2002/0128371 A1 | 9/2002 | Poppe et al. |
| 2003/0020783 A1 | 1/2003 | Sanada |
| 2003/0041884 A1 | 3/2003 | Bahr |
| 2003/0049383 A1 | 3/2003 | Ogasahara et al. |
| 2004/0028830 A1 | 2/2004 | Bauer |
| 2004/0089234 A1 | 5/2004 | Hagglund et al. |
| 2004/0123159 A1 | 6/2004 | Kerstens |
| 2004/0173144 A1 | 9/2004 | Edwards |
| 2004/0221804 A1 | 11/2004 | Zimmermann et al. |
| 2004/0231594 A1 | 11/2004 | Edwards |
| 2004/0238522 A1 | 12/2004 | Edwards |
| 2004/0256501 A1 | 12/2004 | Mellentine et al. |
| 2004/0261700 A1 | 12/2004 | Edwards |
| 2005/0000422 A1 | 1/2005 | Edwards |
| 2005/0015050 A1 | 1/2005 | Mowery et al. |
| 2005/0016451 A1 | 1/2005 | Edwards |
| 2005/0023367 A1 | 2/2005 | Reighard et al. |
| 2005/0243112 A1 | 11/2005 | Kobayashi et al. |
| 2006/0061613 A1 | 3/2006 | Fienup et al. |
| 2006/0068109 A1 | 3/2006 | Frankenberger et al. |
| 2006/0146379 A1 | 7/2006 | Katagami et al. |
| 2006/0238587 A1 | 10/2006 | Horsnell |
| 2006/0251796 A1 | 11/2006 | Fellingham |
| 2007/0062383 A1 | 3/2007 | Gazeau |

(56) References Cited

U.S. PATENT DOCUMENTS

| | | |
|---|---|---|
| 2007/0292626 A1 | 12/2007 | Larsson et al. |
| 2008/0271674 A1 | 11/2008 | Rademarcher |
| 2008/0309698 A1 | 12/2008 | Nakano et al. |
| 2009/0027433 A1 | 1/2009 | Van De Wynckel et al. |
| 2009/0029069 A1 | 1/2009 | Edwards |
| 2009/0181182 A1 | 7/2009 | Sloan |
| 2010/0132612 A1* | 6/2010 | Achrainer ............... B05B 15/55 118/696 |
| 2010/0156970 A1 | 6/2010 | Ikushima |
| 2010/0170918 A1 | 7/2010 | Achrainer |
| 2010/0225685 A1 | 9/2010 | Kwon et al. |
| 2010/0279013 A1 | 11/2010 | Frankenberger et al. |
| 2010/0282283 A1 | 11/2010 | Bauer |
| 2010/0321448 A1 | 12/2010 | Buestgens et al. |
| 2011/0014371 A1 | 1/2011 | Herre et al. |
| 2011/0084150 A1 | 4/2011 | Merchant |
| 2011/0248046 A1* | 10/2011 | Simion ................ B05C 5/0225 222/135 |
| 2011/0262622 A1 | 10/2011 | Herre |
| 2012/0085842 A1 | 4/2012 | Ciardella |
| 2012/0105522 A1* | 5/2012 | Wallsten ..................... B41J 2/14 347/9 |
| 2012/0114849 A1 | 5/2012 | Melcher |
| 2012/0162331 A1 | 6/2012 | Kataoka |
| 2012/0186518 A1 | 7/2012 | Herre |
| 2012/0219699 A1 | 8/2012 | Pettersson et al. |
| 2012/0249679 A1 | 10/2012 | Beier et al. |
| 2012/0282405 A1 | 11/2012 | Herre |
| 2013/0201243 A1* | 8/2013 | Yoshida ..................... B41J 2/18 347/18 |
| 2013/0215203 A1* | 8/2013 | Chen ....................... B41J 11/02 347/102 |
| 2013/0257984 A1 | 10/2013 | Beier et al. |
| 2013/0284833 A1 | 10/2013 | Fritz et al. |
| 2014/0076985 A1 | 3/2014 | Pettersson et al. |
| 2014/0242285 A1 | 8/2014 | Pettersson et al. |
| 2014/0329001 A1 | 11/2014 | Rouaud et al. |
| 2015/0009254 A1 | 1/2015 | Kaiba et al. |
| 2015/0042716 A1 | 2/2015 | Beier et al. |
| 2015/0086723 A1 | 3/2015 | Bustgens |
| 2015/0098028 A1 | 4/2015 | Ohnishi |
| 2015/0328654 A1* | 11/2015 | Schwab ..................... B05C 9/14 118/712 |
| 2015/0375258 A1 | 12/2015 | Fritz et al. |
| 2015/0375507 A1 | 12/2015 | Ikushima |
| 2016/0052312 A1 | 2/2016 | Pitz et al. |
| 2016/0074822 A1 | 3/2016 | Han |
| 2016/0288552 A1 | 10/2016 | Ikushima |
| 2016/0306364 A1 | 10/2016 | Ikushima |
| 2017/0087837 A1 | 3/2017 | Stefani et al. |
| 2017/0106393 A1 | 4/2017 | Hamspon et al. |
| 2017/0136481 A1 | 5/2017 | Fritz et al. |
| 2017/0252765 A1 | 9/2017 | Medard |
| 2017/0267002 A1 | 9/2017 | Pitz et al. |
| 2017/0299088 A1* | 10/2017 | Rau ......................... F16K 11/07 |
| 2017/0361346 A1 | 12/2017 | Lahidjanian et al. |
| 2018/0022105 A1 | 1/2018 | Nakamura et al. |
| 2018/0056670 A1 | 3/2018 | Kerr |
| 2018/0093491 A1 | 4/2018 | Murayama et al. |
| 2018/0178505 A1 | 6/2018 | Stefani et al. |
| 2018/0222186 A1* | 8/2018 | Stefani ...................... B41J 2/155 |
| 2018/0250955 A1 | 9/2018 | Herre |
| 2019/0091712 A1 | 3/2019 | Medard et al. |

FOREIGN PATENT DOCUMENTS

| | | | |
|---|---|---|---|
| CN | 1438942 | A | 8/2003 |
| CN | 1512919 | A | 7/2004 |
| CN | 1176815 | C | 11/2004 |
| CN | 1668386 | A | 9/2005 |
| CN | 1761530 | A | 4/2006 |
| CN | 101264698 | A | 9/2008 |
| CN | 101309755 | A | 11/2008 |
| CN | 101657264 | A | 2/2010 |
| CN | 101784348 | A | 7/2010 |
| CN | 102177002 | A | 9/2011 |
| CN | 102198434 | A | 9/2011 |
| CN | 103153483 | A | 6/2013 |
| CN | 103909743 | A | 7/2014 |
| CN | 104613205 | A | 5/2015 |
| CN | 104994966 | A | 10/2015 |
| CN | 106414081 | A | 2/2017 |
| DE | 1284250 | A | 11/1968 |
| DE | 7710895 | U1 | 9/1977 |
| DE | 3045401 | A1 | 7/1982 |
| DE | 3221327 | A1 | 9/1983 |
| DE | 3225554 | A1 | 1/1984 |
| DE | 3634747 | A1 | 8/1987 |
| DE | 3804092 | A1 | 9/1988 |
| DE | 4115111 | A1 | 11/1991 |
| DE | 4138491 | A1 | 5/1993 |
| DE | 9405600 | U1 | 6/1994 |
| DE | 68924202 | T2 | 2/1996 |
| DE | 19606716 | C1 | 8/1997 |
| DE | 19630290 | A1 | 1/1998 |
| DE | 19731829 | A1 | 1/1999 |
| DE | 19743804 | A1 | 4/1999 |
| DE | 9422327 | U1 | 3/2000 |
| DE | 19852079 | A1 | 5/2000 |
| DE | 19936790 | A1 | 2/2001 |
| DE | 20017629 | U1 | 3/2001 |
| DE | 10048749 | A1 | 4/2002 |
| DE | 69429354 | T2 | 5/2002 |
| DE | 69622407 | T2 | 3/2003 |
| DE | 10307719 | A1 | 9/2003 |
| DE | 60001898 | T2 | 2/2004 |
| DE | 102004021223 | | 12/2004 |
| DE | 10331206 | A1 | 1/2005 |
| DE | 102004034270 | A1 | 2/2006 |
| DE | 102004044655 | A1 | 3/2006 |
| DE | 102004049471 | A1 | 4/2006 |
| DE | 60212523 | T2 | 2/2007 |
| DE | 69836128 | T2 | 8/2007 |
| DE | 60125369 | T2 | 10/2007 |
| DE | 102006021623 | A1 | 11/2007 |
| DE | 102006056051 | A1 | 5/2008 |
| DE | 102007018877 | A1 | 10/2008 |
| DE | 102007037663 | A1 | 2/2009 |
| DE | 10 2008 018 881 | A1 | 9/2009 |
| DE | 102008053178 | A1 | 5/2010 |
| DE | 102009029946 | A1 | 12/2010 |
| DE | 102009038462 | A1 | 3/2011 |
| DE | 102010004496 | A1 | 7/2011 |
| DE | 102010019612 | A1 | 11/2011 |
| DE | 102012006371 | A1 | 7/2012 |
| DE | 102012005087 | A1 | 10/2012 |
| DE | 102012005650 | A1 | 9/2013 |
| DE | 102012212469 | A | 1/2014 |
| DE | 102012109123 | A1 | 3/2014 |
| DE | 202013101134 | U1 | 6/2014 |
| DE | 102013002412 | A1 | 8/2014 |
| DE | 102013011107 | A1 | 8/2014 |
| DE | 102013205171 | A1 | 9/2014 |
| DE | 102014006991 | A1 | 12/2014 |
| DE | 102014007523 | A1 | 11/2015 |
| DE | 102014008183 | A1 | 12/2015 |
| DE | 102014012705 | A1 | 3/2016 |
| DE | 102014013158 | A1 | 3/2016 |
| EP | 0138322 | A1 | 4/1985 |
| EP | 0297309 | A2 | 1/1989 |
| EP | 0665106 | A2 | 8/1995 |
| EP | 1120258 | A2 | 8/2001 |
| EP | 1764226 | A1 | 3/2007 |
| EP | 1852733 | A1 | 11/2007 |
| EP | 1884365 | A1 | 2/2008 |
| EP | 1946846 | A1 | 7/2008 |
| EP | 2002898 | A1 | 12/2008 |
| EP | 2133154 | A2 | 12/2009 |
| EP | 2151282 | A1 | 2/2010 |
| EP | 2196267 | A2 | 6/2010 |
| EP | 2380744 | A2 | 10/2011 |
| EP | 2433716 | A1 | 3/2012 |
| EP | 2468512 | A1 | 6/2012 |

(56) References Cited

FOREIGN PATENT DOCUMENTS

| | | |
|---|---|---|
| EP | 2641661 A1 | 9/2013 |
| EP | 2644392 A2 | 10/2013 |
| EP | 2777938 A1 | 9/2014 |
| EP | 2799150 A1 | 11/2014 |
| EP | 2842753 A1 | 3/2015 |
| EP | 3002128 A2 | 4/2016 |
| EP | 3156138 A1 | 4/2017 |
| EP | 3213823 A1 | 9/2017 |
| EP | 3257590 A1 | 12/2017 |
| EP | 3272669 A1 | 1/2018 |
| EP | 3068626 B1 | 10/2019 |
| FR | 3010918 A1 | 3/2015 |
| GB | 2200433 A | 8/1988 |
| GB | 2367771 A | 4/2002 |
| GB | 2507069 A | 4/2014 |
| GN | 102971080 A | 3/2013 |
| GN | 105358259 A | 2/2016 |
| JP | S5722070 A | 2/1982 |
| JP | S62116442 A | 5/1987 |
| JP | H04-106669 U | 9/1992 |
| JP | H0798171 B2 | 10/1995 |
| JP | H09192583 A | 7/1997 |
| JP | 2000158670 A | 6/2000 |
| JP | 2000317354 A | 11/2000 |
| JP | 2001129456 A | 5/2001 |
| JP | 2001157863 A | 6/2001 |
| JP | 2001239652 A | 9/2001 |
| JP | 2001300404 A | 10/2001 |
| JP | 2002361863 A | 12/2002 |
| JP | 2003506210 A | 2/2003 |
| JP | 2003136030 A | 5/2003 |
| JP | 2003164780 A | 6/2003 |
| JP | 2004142382 A | 5/2004 |
| JP | 2005526234 A | 9/2005 |
| JP | 2007021760 A | 2/2007 |
| JP | 2007152666 A | 6/2007 |
| JP | 2007520340 A | 7/2007 |
| JP | 2007245633 A | 9/2007 |
| JP | 2007289848 A | 11/2007 |
| JP | 2008110332 A | 5/2008 |
| JP | 2009006324 A | 1/2009 |
| JP | 2010528852 A | 8/2010 |
| JP | 2010531213 A | 9/2010 |
| JP | 2010531729 A | 9/2010 |
| JP | 2010241003 A | 10/2010 |
| JP | 2011206958 A | 10/2011 |
| JP | 2012506305 A | 3/2012 |
| JP | 2012135925 A | 7/2012 |
| JP | 2012206116 A | 10/2012 |
| JP | 2012228643 A | 11/2012 |
| JP | 2012228660 | 11/2012 |
| JP | 2013067179 A | 4/2013 |
| JP | 2013530816 A | 8/2013 |
| JP | 2013530816 B2 | 8/2013 |
| JP | 2013188706 A | 9/2013 |
| JP | 2014019140 A | 2/2014 |
| JP | 2014050832 A | 3/2014 |
| JP | 2014111307 A | 6/2014 |
| JP | 2015-009222 A | 1/2015 |
| JP | 2015096322 A | 5/2015 |
| JP | 2015520011 A | 7/2015 |
| JP | 2015193129 A | 11/2015 |
| JP | 2016507372 A | 3/2016 |
| JP | 2016526910 A | 9/2016 |
| JP | 2016175077 A | 10/2016 |
| JP | 2016175662 A | 10/2016 |
| JP | 2018012065 A | 1/2018 |
| JP | 2020513311 A | 5/2020 |
| JP | 2020513314 A | 5/2020 |
| WO | 8601775 A1 | 3/1986 |
| WO | 9856585 A1 | 12/1998 |
| WO | 02098576 A1 | 12/2002 |
| WO | 03021519 A1 | 3/2003 |
| WO | 2003062129 A2 | 7/2003 |
| WO | 2004048112 A1 | 6/2004 |
| WO | 2004085738 A2 | 10/2004 |
| WO | 2005016556 A1 | 2/2005 |
| WO | 2005075170 A1 | 8/2005 |
| WO | 2006022217 A1 | 3/2006 |
| WO | 2007121905 A1 | 11/2007 |
| WO | 2009019036 A1 | 2/2009 |
| WO | 2010046064 A1 | 4/2010 |
| WO | 2010146473 A1 | 12/2010 |
| WO | 2011044491 A1 | 4/2011 |
| WO | 2011128439 A1 | 10/2011 |
| WO | 2011138048 A1 | 11/2011 |
| WO | 2013121565 A1 | 8/2013 |
| WO | 2015071270 A1 | 5/2015 |
| WO | 2015096322 A1 | 7/2015 |
| WO | 2015186014 A1 | 12/2015 |
| WO | 2016-087016 A1 | 6/2016 |
| WO | 2016142510 A1 | 9/2016 |
| WO | 2016145000 A1 | 9/2016 |
| WO | 2017006245 A1 | 1/2017 |
| WO | 2017006246 A1 | 1/2017 |
| WO | 2018102846 A1 | 6/2018 |

OTHER PUBLICATIONS

European Search Report for EP20170021.8 dated Sep. 8, 2020 (11 pages—English translation not available).
European Search Report for EP20170025.9 dated Sep. 9, 2020 (4 pages—English translation not available).
European Search Report for EP20170016.8 dated Sep. 7, 2020 (4 pages—English translation not available).
China National Intellectual Property Administration Office Action and Search Report for CN Application No. 201780077018.3 dated Aug. 27, 2020 (11 pages; Search Report in English).
Chinese Office Action and Search Report for CN201780077603.3 dated Oct. 12, 2020 (15 pages; English translation not available).
JPO Submission for JP2019-531096; submitted Dec. 21, 2020 (32 pages; with English translation).
JPO Submission for JP2019-531957; submitted Dec. 21, 2020 (21 pages; with English translation).
Chinese Office Action for Application No. CN20178007017.9 dated Aug. 31, 2020 (8 pages; with English translation).
Non Final Office Action for U.S. Appl. No. 16/468,697 dated Oct. 22, 2020 (78 pages).
Non Final Office Action for U.S. Appl. No. 16/468,696 dated Nov. 2, 2020 (58 pages).
Non Final Office Action for U.S. Appl. No. 16/468,689 dated Oct. 15, 2020 (77 pages).
Chinese Office Action for CN201780077476.7 dated Sep. 23, 2020 (12 pages; English translation not available).
Non-Final Office Action for U.S. Appl. No. 16/468,691 dated Jan. 7, 2021 (79 pages).
EPO Official Notification of Opposition for Application No. 17821803.8 dated Feb. 10, 2021 (64 pages; with English machine translation).
Non-Final Office Action dated Feb. 5, 2021 for U.S. Appl. No. 16/468,701 (80 pages).
Non-Final Office Action dated Feb. 18, 2021 for U.S. Appl. No. 16/468,692 (97 pages).
Ghasem, G. et al.; "Chapter 2 Background on Sprays and Their Production", Industrial Sprays and Atomization Design, Analysis and Applications, Jan. 1, 2002, Springer, London, pp. 7-33, XP009195118, ISBN: 978-1-4471-3816-7.
International Search Report and Written Opinion for PCT/EP2017/081141 dated Feb. 26, 2018 (17 pages; with English translation).
International Search Report and Written Opinion for PCT/EP2017/081114 dated May 15, 2018 (33 pages; with English translation).
Anonymous: "Roboterkalibrierung—Wikipedia", Nov. 7, 2016, XP055471615, Gefunden im Internet: URL: https://de.wikipedia.org/w/index.php?title=Roboterkalibrierung&oldid=159460756 [gefunden am Apr. 30, 2018] das ganze dockument (8 pages; with English translation).
Beyer, Lukas: "Genauigkeitssteigerung von Industrierobotern", Forschungsberichte Aus Dem Laboratorium Fertigungstechnik/Helmut-Schmidt-Universitat, Universitat Der Bundeswehr Ham-

(56) References Cited

OTHER PUBLICATIONS burg, Dec. 31, 2005, Seiten 1-4, XP009505118; ISSN: 1860-2886; ISBN: 978-3-8322-3681-6 (13 pages; with English machine translation).
International Search Report and Written Opinion for PCT/EP2017/081108 dated Feb. 28, 2018 (with English translation; 18 pages).
International Search Report and Written Opinion for PCT/EP2017/081099 dated Feb. 26, 2018 (21 pages; with English translation).
International Search Report and Written Opinion for PCT/EP2017/081102 dated Mar. 14, 2018 (16 pages; with English translation).
International Search Report and Written Opinion for PCT/EP2017/081105 dated Feb. 26, 2018 (19 pages; with English translation).
International Search Report and Written Opinion for PCT/EP2017/081152 dated May 15, 2018 (25 pages; with English translation).
International Search Report and Written Opinion for PCT/EP2017/081098 dated May 14, 2018 (26 pages; with English translation).
International Search Report and Written Opinion for PCT/EP2017/081101 dated Feb. 28, 2018 (14 pages; with English translation).
International Search Report and Written Opinion for PCT/EP2017/081121 dated Feb. 26, 2018 (20 pages; with English translation).
International Search Report and Written Opinion for PCT/EP2017/081117 dated Mar. 12, 2018 (27 pages; with English translation).
International Search Report and Written Opinion for PCT/EP2017/081123 dated Feb. 26, 2018 (20 pages; with English translation).
EPO Examination Report for Application No. 201702818.1 dated Dec. 18, 2020 (with English machine translation; 6 pages).
Non-Final Office Action dated Apr. 28, 2021 for U.S. Appl. No. 16/468,693 (109 pages).
Notice of Allowance mailed in U.S. Appl. No. 16/468,689 dated Jun. 2, 2021 (38 pages).
Fianl Office Action dated May 13, 2021 for U.S. Appl. No. 16/468,691 (70 pages).
JPO Notification of Reasons for Rejection for Application No. JP2019-532030 dated May 18, 2021 (6 pages; with English translation).
CIPO Office Action for Application No. CN201780077474.8 dated Apr. 26, 2021 (17 pages; with English translation).
Japanese Notification of Reasons for Rejection dated Jun. 1, 2021 for Application No. JP2019-531944 (14 pages; with English machine translation).
Chinese Office Action dated Jun. 2, 2021 for Application No. CN201780077017.9 (17 pages; with English machine translation).
Japanese Notification of Reasons for Rejection dated Jun. 8, 2021 for Application No. JP2019-531957 (13 pages; with English machine translation).
Supplemental Notice of Allowability dated Jul. 8, 2021 for U.S. Appl. No. 16/468,696 (11 pages).
Liptak, Bela. (2006). Instrument Engineers' Handbook (4th Edition)—Process Control and Optimization, vol. 2-2.1.3.5 Process Time Constant, (pp. 99-102). Taylor & Francis. Retrieved from https://app.knovel.eom/hotlink/pdf/id:kt00CC7HL1/instrument-engineers/process-time-constant (Year: 2006).
Japanese Patent Office Notice of Reasons of Refusal for Application No. JP 2019-531967 dated Jun. 8, 2021 (8 pages; with English machine translation).
JPO Decision to Grant dated Oct. 3, 2021 for Application No. JP2019-532113 (7 pages; with English machine translation).
Final Office Action dated Oct. 7, 2021 for U.S. Appl. No. 16/468,693 (58 pages).
JPO Office Action for Application No. JP2019-531097 dated Jun. 29, 2021 (10 pages; with English machine translation).
JPO Office Action for Application No. 2019-531096 dated Jul. 6, 2021 (9 pages; with English machine translation).
JPO Office Action for Application No. 2019-531098 dated Jul. 6, 2021 (5 pages; English translation only).
JPO Office Action for Application No. 2019-531459 dated Jul. 6, 2021 (8 pages; with English machine translation).
Notification of Reasons for Refusal for Application No. JP2019-532012 dated Jun. 22, 2021 (6 pages; with English machine translation).
Notification of Reasons for Refusal for Application No. JP2019-527330 dated Jun. 22, 2021 (10 pages; with English machine translation).
Final Office Action dated Mar. 19, 2021 for U.S. Appl. No. 16/468,696 (45 pages).
Final Office Action dated Jun. 11, 2021 for U.S. Appl. No. 16/468,701 (53 pages).
JPO Office Action dated Jul. 3, 2021 for Application No. JP2019-532024 (12 pages; with English machine translation).
Non-Final Office Action dated Aug. 27, 2021 for U.S. Appl. No. 16/468,695 (149 pages).
Non-Final Office Action dated Dec. 24, 2021 for related U.S. Appl. No. 16/468,693 (19 pages).
Non-Final Office Action dated Jan. 6, 2022 for related U.S. Appl. No. 16/468,701 (36 pages).
JPO Decision to Grant in related application JP2019-532012 dated Jan. 25, 2022 (6 pages; with English machine translation).

* cited by examiner

PRINT HEAD HAVING A TEMPERATURE-CONTROL DEVICE

CROSS-REFERENCE TO RELATED APPLICATIONS

This application is a national stage of, and claims priority to, Patent Cooperation Treaty Application No. PCT/EP2017/081117, filed on Dec. 1, 2017, which application claims priority to German Application No. DE 10 2016 014 943.4, filed on Dec. 14, 2016, which applications are hereby incorporated herein by reference in their entireties.

BACKGROUND

The disclosure relates to an application device for application of an application medium onto a component, preferably for application of a paint onto a motor vehicle body component, comprising a print head for preferably serial and/or overspray-free application of the application medium.

Atomisers (e.g. rotary atomisers, airmix atomisers, airless atomisers, etc.) are normally used as the application device for series painting of motor vehicle body components, but these have the disadvantage of a limited degree of application efficiency such that only part of the applied paint is deposited on the components to be coated, while the rest of the applied coating must be disposed of as so-called over spray.

In terms of the general prior art, reference is initially made to DE 20 2013 101 134 U1, DE 10 2010 019 612 A1 and DE 197 43 804 A1.

U.S. Pat. No. 9,108,424 B2 discloses a drop-on-demand valve-jet printer, the operating principle of which is based on the use of electric valves. Here, a magnetic piston is guided in a coil and is lifted up by the supply of current into the coil. Thus, in permanent operation, the valve openings must either be opened and closed with maximum frequency or kept permanently in the opening position. Both can lead to an overheating of the coils or at least to a pronounced heating of the coils since the valves are embodied to be closed by spring force and voltage is applied to the coil in order to open the valve. Overheating can lead to the destruction of the coils. Pronounced heating can have negative effects on the application medium. The application medium can be damaged by the absorbed heat or energy. The application medium can be influenced by the absorbed heat or energy in terms of its viscosity such that the coating results vary in different operating situations. A high opening/closing frequency or permanent opening can lead e.g. to a high degree of heat and thus to a low degree of viscosity of the application medium, while a low frequency or an only brief opening can lead to less heat and thus to a higher viscosity of the application medium. Variations in this case are inexpedient.

BRIEF DESCRIPTION OF THE DRAWINGS

FIG. 9 shows a schematic view of a print head in order to generate a droplet jet according to one example of the disclosure.

DETAILED DESCRIPTION

The disclosure relates to an application device for applying an application medium onto a component, preferably for application of a paint onto a motor vehicle body component.

The application device includes at least one print head for preferably serial and/or permanent application of the application medium. The print head includes: a nozzle plate, at least one nozzle (e.g. opening) in the nozzle plate for discharge of the application medium, at least one valve element (e.g. armature or valve needle), which is movable relative to the nozzle plate, for control of the application medium discharge through the at least one nozzle, wherein the at least one movable valve element closes the at least one nozzle in a closing position and releases it in an opening position, and at least one drive (in particular valve drive) for moving the at least one valve element.

The application device is preferably characterised in that it includes at least one temperature control apparatus for reducing a heating of the at least one drive expediently during the application of the application medium.

The at least one temperature control apparatus enables in particular a serial and/or permanent application of the application medium by means of the print head and alternatively or additionally a substantially keeping constant of the temperature and thus the framework conditions in the print head, as a result of which e.g. application results which vary depending on the temperature can be avoided or at least reduced. A high opening/closing frequency can furthermore be enabled.

In the context of the disclosure, the temperature control apparatus can serve to cool the drive. A heating of the drive can be reduced or almost prevented by cooling the drive. In the context of the disclosure, the temperature control apparatus can alternatively or additionally serve to heat the application medium (preferably at least at the start of operation). By heating the application medium, the viscosity of the application medium can be reduced so that the quantity of the output coating medium can be kept constant or a certain volumetric flow is enabled in the first place. The heating furthermore also enables a reduction in the coating medium pressure in the case of a simultaneously constant output quantity.

The reduction of excessive heating of the drive can thus be expediently enabled in the context of the disclosure by a targeted heating under a critical temperature and/or a targeted cooling. Temperature control in the context of the disclosure thus expediently includes heating and/or cooling.

For this purpose, the temperature control fluid volumetric flow and/or the temperature thereof are controlled so that e.g. the service life of the drive is increased and/or that the temperature in the print head lies below the ignition temperature (e.g. <+100° C.) of the solvents used in the coating media.

It is possible that the at least one temperature control apparatus includes, expediently for the reduction of the heating of the at least one drive, a heating apparatus for heating the application medium and thus to reduce the viscosity of the application medium. Alternatively or additionally, it is possible that the at least one temperature control apparatus includes, expediently for the reduction of the heating of the at least one drive, a cooler apparatus and/or a heat exchanger apparatus for cooling the at least one drive.

The heating apparatus can serve e.g. to heat a temperature control fluid, wherein the temperature control fluid thus represents a heating fluid for heating the application medium.

The cooler apparatus and/or heat exchanger apparatus can serve e.g. to cool a temperature control fluid, wherein the temperature control fluid thus represents a cooling fluid for cooling the at least one drive.

The at least one temperature control apparatus can operate e.g. on a temperature control fluid basis and thus make available active temperature control.

It is possible that the at least one temperature control apparatus includes at least one temperature control fluid line (e.g. a duct, a bore, a tube, etc.) for a temperature control fluid.

It is possible that at least one temperature control fluid line runs within the print head. At least one temperature control fluid line can also extend, however, e.g. along the outside of the print head in order to cool the print head from the outside.

The application medium is preferably not used as the temperature control fluid, in particular not as a cooling temperature control fluid.

The temperature control fluid can be e.g. air, water or a coolant, preferably free from volatile organic compounds (VOC-free coolant—VOC: volatile organic compounds).

It is possible that an application medium supply for the supply of the application medium to the at least one nozzle runs in the print head.

The application medium supply can be temperature-controlled (expediently cooled and/or heated) e.g. at least in sections by at least one temperature control apparatus.

In particular, at least one temperature control fluid line e.g. for heating the application medium can extend along the application medium supply, preferably so that the temperature control fluid can flow around the application medium supply. For this purpose, the temperature control fluid line can extend e.g. in particular in a spiral or annular manner in the circumferential direction of the application medium supply, around the application medium supply.

The nozzle plate can preferably delimit the application medium supply in its longitudinal direction.

It is possible that at least one temperature control fluid line for cooling the drive, in particular an electric coil of the drive, extends along the drive, in particular the coil, and/or extends so that the temperature control fluid flows around the at least one drive, in particular the coil.

The at least one temperature control apparatus can include in particular a pump for conveying the temperature control fluid.

The at least one temperature control apparatus can make available e.g. passive temperature control.

It is possible that the at least one temperature control apparatus includes a heat-conducting construction composed of heat-conductive material.

The heat-conducting construction can serve e.g. to effectively discharge heat generated by the at least one drive expediently to the outside. Alternatively or additionally, the heat-conducting construction can serve e.g. to conduct heat generated by at least one temperature control apparatus (e.g. a temperature control fluid line) effectively to the application medium. Alternatively or additionally, the heat-conducting construction can serve e.g. to conduct cold generated by the at least one temperature control apparatus (e.g. a temperature control fluid line) to the at least one drive.

The heat-conducting construction can thus serve in the context of the disclosure in particular to effectively transmit heat in order to heat the application medium and/or cold in order to cool the at least one drive and/or effectively discharge heat of the at least one drive.

The heat-conducting construction can include e.g. heat-conducting plates and/or heat-conducting ribs.

The heat-conducting construction can also include e.g. a heat-conducting function block, wherein the at least one drive can be positioned in the heat-conducting function block. All of the drives, in particular coils, of the print head are preferably accommodated in the heat-conducting function block.

The heat-conducting construction can extend e.g. at least in sections on the outside of the print head and/or at least in sections within the print head. As a result of this, e.g. effective heat/cold transmission from inside the print head to the outside or vice versa can be ensured.

The heat-conducting construction can be arranged e.g. on the at least one drive, preferably the coil, preferably so that it spans the at least one drive in its circumferential direction, which enables effective discharge of heat and/or supply of cold to the at least one drive. For this purpose, the heat-conducting construction can be arranged e.g. in the form of a sleeve or bushing around the at least one drive.

The heat-conducting construction can also extend e.g. along the application medium supply. E.g. the nozzle plate itself can be embodied as a heat-conducting construction.

The heat-conductive material can include e.g. a metallic material, copper or aluminium.

It is possible that the at least one temperature control apparatus includes a cooling pad arrangement (e.g. a cooling pillow or cooling pack arrangement, expediently of sandwich design) for packing in of the print head at least in sections.

The cooling pad arrangement can be embodied e.g. for cooling fluid to flow through it at least temporarily continuously and thus bring about active temperature control. Nevertheless, in replacement mode, a cooling pad arrangement can also be mounted in a precooled manner on the print head and be replaced after heating by another precooled cooling pad arrangement so that the cooling pad arrangement can also be used for passive temperature control.

It is possible that at least one of the following is mounted e.g. externally on the print head and/or is mounted at least in sections in the print head: the heating apparatus, the cooler and/or heat exchanger apparatus, at least one temperature control fluid line and/or the pump.

The at least one drive preferably operates electromechanically (e.g. electromagnetically or piezoelectrically).

The at least one drive includes in particular an electric coil for activating the valve element. The coil is preferably that part of the at least one drive, the heating of which should be reduced. The at least one temperature control apparatus thus serves in particular to reduce a heating of the coil during application of the application medium.

It is possible that the at least one drive includes a preferably elastic restoring element for activating the valve element.

It is possible that the valve element is displaced as a function of the energisation of the coil.

In order to generate a droplet jet, the coil and an e.g. elastic restoring element (e.g. a spring) can ensure that the valve element is moved to and fro between the opening position and the closing position. The droplet jet can include e.g. several substantially spherical or elongated droplets. The droplet jet is expediently present between the at least one nozzle and the component.

In order to generate a coherent application medium jet, the coil can hold the valve element permanently in the opening position. A preferably elastic restoring element can move e.g. the valve element in idle phases into the closing position, wherein the valve element is expediently held permanently in the opening position during the application of the application medium. The coherent application medium jet is expediently present between the at least one nozzle and the component.

The application medium can be e.g. viscous, highly viscous or structurally viscous, preferably with a viscosity of higher than 15 mPas, higher than 60 mPas, higher than 100 mPas or higher than 130 mPas and/or preferably with a viscosity lower than 400 mPas or lower than 200 mPas or lower than 1500 mPas (measured at a shear rate of 1000 $s^{-1}$) and/or be a paint.

It is possible that the at least one temperature control apparatus (in particular the heating apparatus, the cooler and/or heat exchanger apparatus, at least one temperature control fluid line and/or the pump) is part of a loop.

The at least one temperature control apparatus can perform temperature control for the at least one drive during the application of the application medium to a temperature of below 80° C., below 60° C., below 50° C. or below 40° C.

The print head can preferably have at least one of the following features:
- the print head is embodied for atomisation- or atomised spray-free application of the application medium, and/or
- the print head is configured for permanent operation and serves to surface coat the component, and/or
- the print head discharges a narrowly restricted application medium jet in contrast to an atomised spray (e.g. atomised and generated by an atomiser), and/or
- the print head discharges a droplet jet e.g. in contrast to a coherent application medium jet in the longitudinal direction of the jet, and/or
- the print head discharges a coherent application medium jet in the longitudinal direction of the jet e.g. in contrast to a droplet jet, and/or
- the print head has a degree of application efficiency of at least 80%, 90%, 95% or 99% so that preferably substantially the entire applied application medium is deposited entirely on the component, substantially without the generation of overspray, and/or
- the print head has a surface coating output of at least 0.5 $m^2$/min, 1 $m^2$/min, 2 $m^2$/min or at least 3 $m^2$/min, and/or the print head has at least one electrically actuable actuator in order to discharge the application medium out of the print head, in particular a magnetic actuator or a piezoactuator.

In the context of the disclosure, the temperature control apparatuses described herein can be used individually or in combination with one another.

It should be mentioned that the print head can preferably include a plurality of nozzles (e.g. more than 5, more than 10 or even more than 15 nozzles) and a corresponding number of associated valve elements and associated drives.

The nozzles are preferably arranged in at least one nozzle row in the nozzle plate.

It should furthermore be mentioned that the term used in the framework of the disclosure of a print head should be understood generally and only serves to delimit atomisers (e.g. rotary atomisers, disc atomisers, airless atomisers, airmix atomisers and/or ultrasonic atomisers) which generate an atomised spray of the application medium to be applied. In contrast to this, the print head according to the disclosure preferably generates at least one, in particular a plurality of spatially narrowly restricted application medium jets.

It should furthermore be mentioned that the print head according to the disclosure preferably serves to apply a paint (e.g. base coat, clear coat, water-based paint and/or solvent-based paint). The print head according to the disclosure can, however, alternatively also be configured to apply other application means, in particular coating means, such as, for example, for the application of sealant, insulation, adhesive, primer, etc., just to mention a few examples.

It should furthermore be mentioned that at least one temperature control fluid line can be embodied at least in sections as an expediently flexible tube, alternatively or additionally, however, also at least in sections as a duct which can be incorporated e.g. into a component arranged in the print head.

The application distance between the at least one nozzle and the component surface is preferably at least 4 mm, 10 mm, 20 mm or 40 mm and/or at most 200 mm or 100 mm.

Temperature control can encompass e.g. only specific subsections of the print head, e.g. the application medium-conducting regions and/or the individual drives, or the substantially entire inner region of the print head.

The disclosure also includes an application robot, preferably a coating or painting robot, with at least one application device as disclosed herein. The application robot expediently serves to guide one or more print heads and can have e.g. at least five or at least six movable robot axes.

It is possible that at least one of the following is mounted at least in sections on or in the applications robot, e.g. on or in a robot housing, a robot arm and/or a robot base: the heating apparatus, the cooler and/or heat exchanger apparatus, a sub-section of at least one temperature control fluid line and/or the pump.

It is nevertheless also possible that at least one of the following is made available spaced apart from the application robot: the heating apparatus, the cooler and/or heat exchanger apparatus, a sub-section of at least one temperature control fluid line and/or the pump.

Air is preferably used as a temperature control medium. This has advantages since compressed air is normally easily available and this can be cooled or heated with simple means. The viscosity of air is low in order to also flow through gaps and small passages. The discharge of the air which flows through the print head can be carried out e.g. through tubes at any point within or outside the painting cabin. The disadvantage of the inferior transmission of heat is by far cancelled out by the above-mentioned advantages.

The preferred examples of the disclosure described with reference to the figures partially match one another, wherein similar or identical parts are provided with the same reference numbers, and for the explanation of which reference is also made to the description of other examples or figures in order to avoid repetition.

Figure 1:
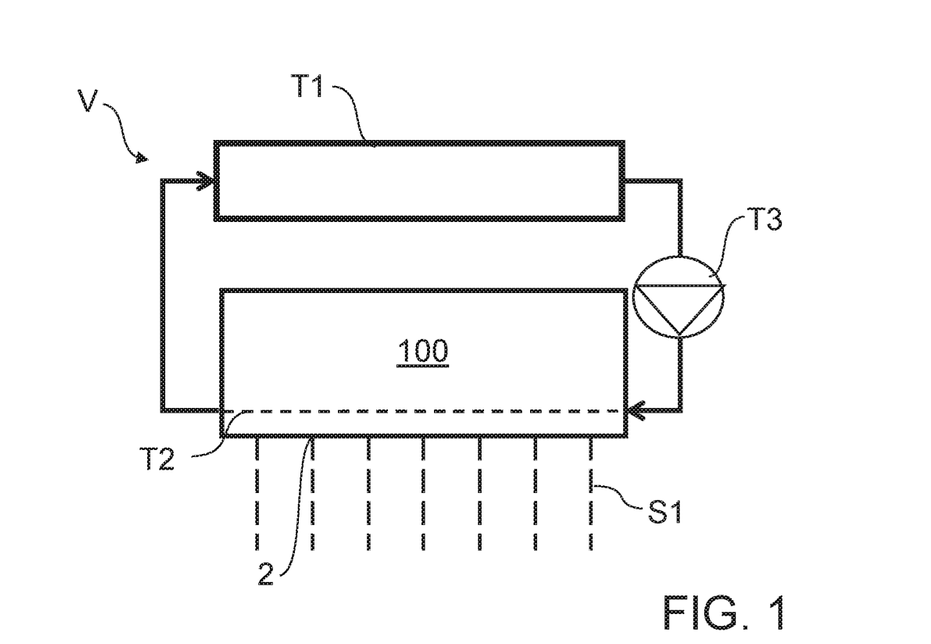
FIG. 1 shows a schematic view of an application device according to one example of the disclosure.
Figure 3:
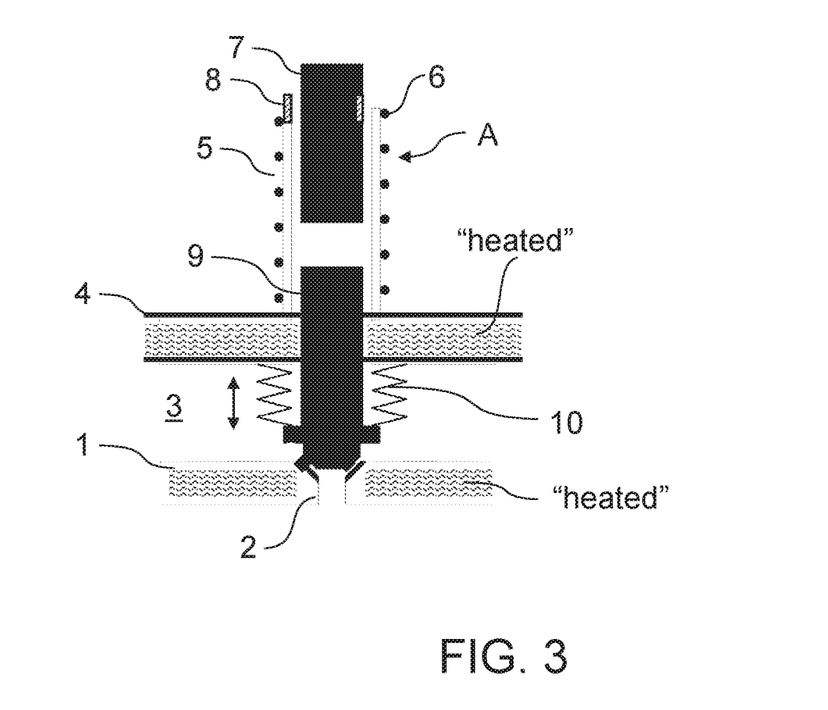
FIG. 3 shows a schematic/detailed representation of a part of a print head according to one example of the disclosure.

FIG. 1 shows a schematic view of an application device V with a print head 100 according to one example of the disclosure, wherein FIG. 3 shows a schematic/detailed view of a part of print head 100. Application device V and in particular print head 100 are described below with joint reference to FIGS. 1 and 3.

Application device V serves to apply an application medium onto a component, in particular for application of a paint onto a motor vehicle body component. For this purpose, application device V includes in particular a print head 100 for series, permanent and substantially atomisation- and atomised spray-free application of the application medium.

FIG. 3 shows a schematic/detailed view of a part of print head 100, with a nozzle plate 1 and a nozzle 2 in nozzle plate 1. A preferably magnetic valve element 9 (e.g. armature or valve needle) which is movable relative to nozzle plate 1 serves to control the application medium discharge through nozzle 2, wherein movable valve element 9 closes nozzle 2 in a closing position and releases it in an opening position. An electromechanical drive (expediently valve drive) A serves to move valve element 9. Print head 100 has a plurality of such nozzles 2, with in each case associated valve element 9 and associated drive A, wherein, for the sake of clarity, only one nozzle is provided with a reference number 2 in FIG. 1. Drive A includes an electric coil 6 for activation of valve element 9 as a function of the energisation of coil 6, in particular for activation of valve element 9 into the opening position. Drive A further includes an elastic restoring element 10, e.g. a spiral spring, for the activation of valve element 9 into the closing position.

The application medium to be applied is supplied via an application medium supply 3 in print head 100 to nozzles 2. Application medium supply 3 is delimited (at the bottom in FIG. 3) by nozzle plate 1 and (at the top in FIG. 3) by a further plate 4, wherein nozzle plate 1 and plate 4 can be separate components or part of an e.g. one-piece/integral (e.g. round or rectangular) tubular application medium supply 3.

Plate 4 has, coaxially with respect to nozzle 2, an opening on which a coil tube 5 is placed coaxially, wherein coil tube 5 is wound with coil 6.

A magnetic coil core 7, which can be sealed off at the upper end in FIG. 3 of coil tube 5 by a seal 8 with respect to coil tube 5, is located in coil tube 5.

Valve element 9 which is displaceable in the direction of the double arrow is furthermore located in sections in coil tube 5, wherein the movement of valve element 9, as already mentioned, is dependent on the energisation of coil 6.

FIG. 3 shows valve element 9 in this case in a closing position in order to close nozzle 2. In contrast, for an application of the application medium, coil 6 is energised so that valve element 9 is pulled upwards in FIG. 3 in order to release nozzle 2.

Restoring spring 10 pushes valve element 9 into the closing position if coil 6 is not energised.

Print head 100 and the construction shown in FIG. 3 serves the purpose of serial and permanent application of the application medium and can optionally be operated in a first operating mode and a second operating mode.

Figure 7:
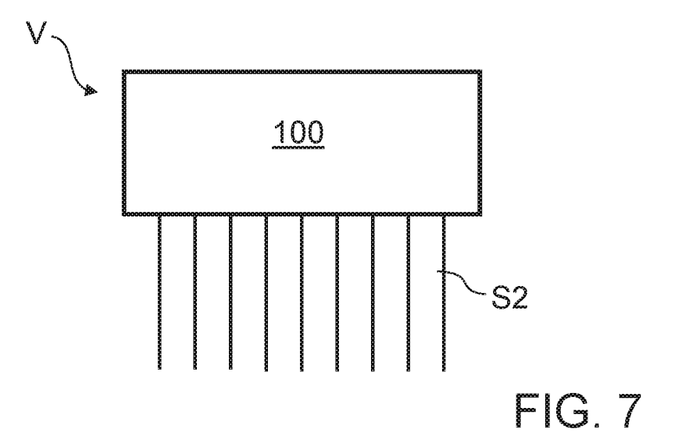
FIG. 7 shows a schematic view of a print head in order to generate a coherent application medium jet according to one example of the disclosure.

In the first operating mode, coil 6 holds valve element 9 permanently in the opening position for the generation of a coherent application medium jet (e.g. FIG. 7). Restoring element 10 expediently serves to move valve element 9 in idle phases into the closing position.

In the second operating mode, coil 6 and restoring element 10 ensure that valve element 9 is moved to and fro between the opening position and the closing position with high frequency for the generation of a droplet jet S1 which has several droplets (e.g. FIGS. 1, 2, 5, 6 and 8).

In both operating modes, coil 6 is under a high degree of strain and thus tends to overheat or at least undergo significant heating. Overheating can lead to the destruction of coil 6. Significant heating can have negative effects on the application medium and/or the application result, wherein significant fluctuations in the application result e.g. in the case of serial painting of motor vehicle components are unacceptable. Paint, in particular water-based paint, can already be damaged at temperatures of above 30° C.

Application device V therefore includes a temperature control apparatus T1, T2 and T3.

Temperature control apparatus T1, T2, T3 serves to reduce heating of drive A and indeed in particular to reduce heating of coil 6 during application of the application medium. Cooling is more important than heating. Heating only functions to a limited extent, i.e. in narrow temperature ranges.

In a particular example, the print head can simultaneously have the possibility for heating and cooling. The processes (cooling and heating) can be carried out simultaneously at different points, e.g. cooling of the coil and heating of the coating medium. The processes can, however, also proceed consecutively, especially at the same point, in the print head. It would, for example, be conceivable that, when starting the print head, a low temperature initially prevails which is increased by activation of the heating process to a temperature which is set during the ongoing process by the development of heat e.g. of the coils.

In order to heat the application medium and thus to reduce the viscosity of the application medium, temperature control apparatus T1, T2, T3 can expediently include a heating apparatus (heater) T1.

Heating apparatus T1 serves in particular to heat a heating fluid, wherein a temperature control fluid line T2 for the heating fluid leads through print head 100, and a pump T3 for conveying the heating fluid is provided. Temperature control fluid line T2 forms a loop so that heating apparatus T1, pump T3 and print head 100 are connected to one another via the loop.

Temperature control fluid line T2 extends through print head 100 and indeed expediently along application medium supply 3 in order to thus heat nozzle plate 1 and/or plate 4 and as a result the application medium in application medium supply 3, which is indicated schematically in FIG. 3 by the hatched areas and the indication "heated".

In order to bring about effective transmission of heat to the application medium in application medium supply 3, temperature control fluid line T2 can extend e.g. as a duct within nozzle plate 1 and/or plate 4. Alternatively or additionally, a temperature control fluid line T2 can naturally also extend on the outside and/or inside along nozzle plate 1 and/or plate 4. Nozzle plate 1 and/or plate 4 can furthermore be manufactured from heat-conductive material, e.g. a metal such as aluminium or copper.

Heating of the application medium leads to the viscosity of the application medium being reduced.

The reduction in the viscosity of the application medium leads to the strain on coil 6 being reduced in terms of its opening effort, which leads to a reduction in the heating of coil 6.

Print head 100 can advantageously additionally be enabled as a result of the heating of the application medium to process application media with a higher viscosity and/or (high) structural viscosity, e.g. with a viscosity of higher than 15 mPas, higher than 30 Pas or even higher than 60 Pas. By way of comparison, ink has e.g. a viscosity of below 15 mPas. Temperature control also enables substantially keeping constant the viscosity of the application medium and thus substantially constant application results independently of the heating of coils 6.

Figure 2:
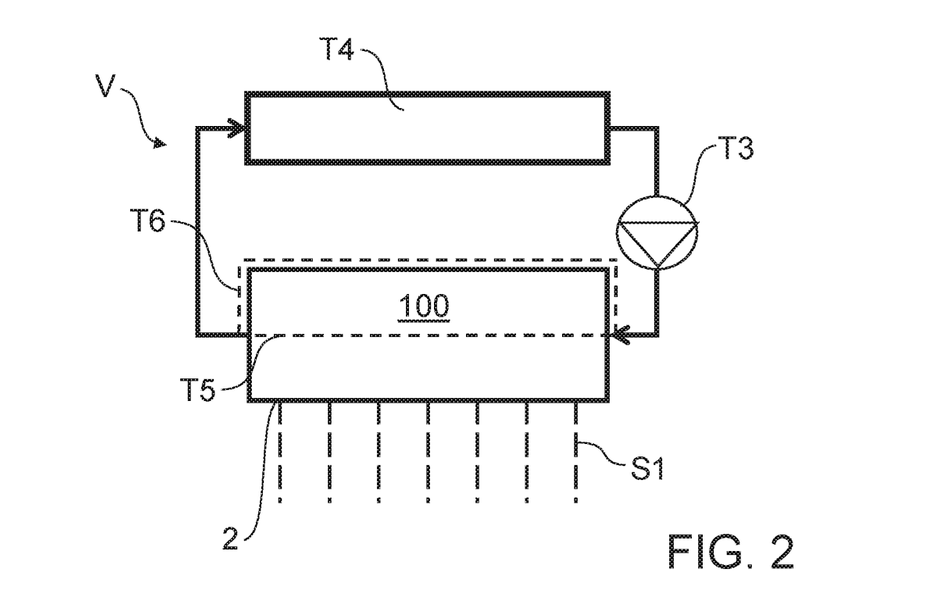
FIG. 2 shows a schematic view of an application device according to another example of the disclosure.
Figure 4:
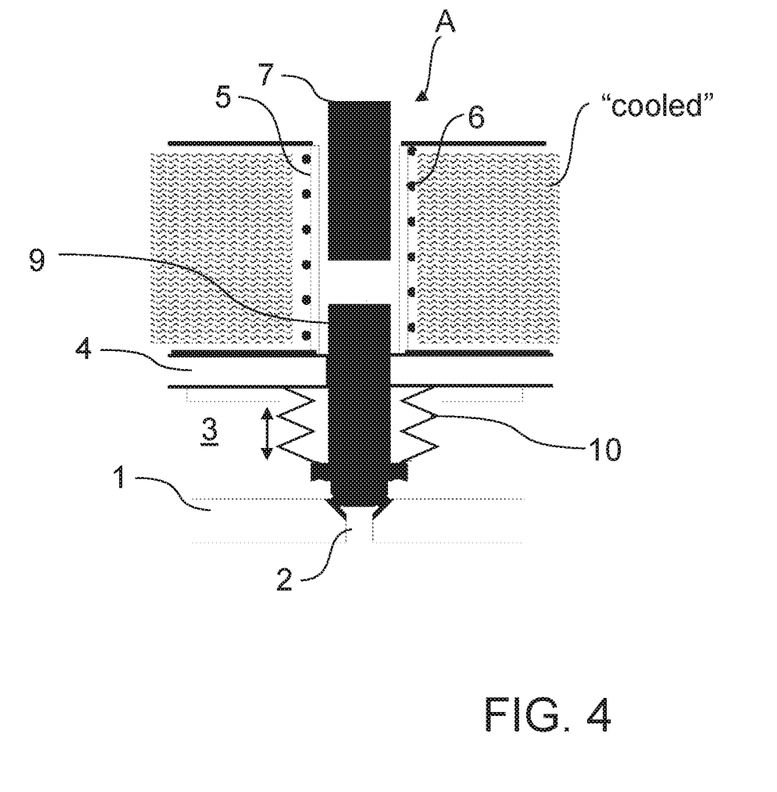
FIG. 4 shows a schematic/detailed representation of a part of a print head according to another example of the disclosure.

FIG. 2 shows a schematic view of an application device V with a print head 100 according to another example of the disclosure, wherein FIG. 4 shows a schematic/detailed view of a part of print head 100. The construction shown in FIG. 4 corresponds substantially to the construction shown in FIG. 3, wherein the reduction in the heating of coil 6 is nevertheless based on a different operating principle, as described further below.

Application device V and in particular print head 100 are described below with joint reference to FIGS. 2 and 4.

Application device V includes a temperature control apparatus T3, T4, T5 and T6.

Temperature control apparatus T3, T4, T5, T6 serves to reduce heating of drive A and indeed in particular to reduce heating coil 6 during application of the application medium.

For this purpose, temperature control apparatus T3, T4, T5, T6 expediently includes a cooler and/or heat exchanger apparatus T4 for cooling coil 6.

Cooler/heat exchanger apparatus T4 serves in particular to cool a cooling fluid, wherein a temperature control fluid line T5, T6 for the cooling fluid leads with a sub-section T5 through print head 100 and optionally extends with a sub-section T6 along the outside of print head 100, and a pump T3 for conveying the cooling fluid is provided. Temperature control fluid line T5, T6 forms a loop so that cooler/heat exchanger apparatus T4, pump T3 and print head 100 are connected to one another via the loop.

Temperature control fluid line T5 extends through print head 100 and indeed expediently along coil 6, e.g. around coil 6, in order to thus cool coil 6, which is indicated schematically in FIG. 4 by the hatched areas and the indication "cooled". In order to bring about effective cooling, temperature control fluid line T5 and/or a heat-conducting construction composed of heat-conductive material can extend in the circumferential direction of coil 6 around coil 6.

Figure 5:
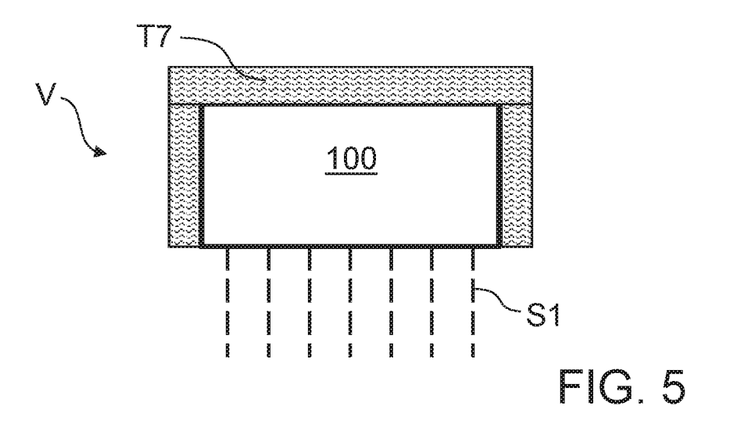
FIG. 5 shows a schematic view of an application device according to one example of the disclosure.

FIG. 5 shows a schematic view of an application device V with a print head 100 according to another example of the disclosure. Print head 100 can be structured as shown e.g. in FIGS. 3 and 4, with or without a cooling or heating function.

One particular feature of the example shown in FIG. 5 is that a temperature control apparatus T7 includes a cooling pad arrangement T7 for packing in print head 100 at least in sections. Cooling pad arrangement T7 can be provided e.g. in the form of one or more cooling pillows or cooling packs.

A cooling pad arrangement T7 heated by the operation of print head 100 can expediently be removed from print head 100 in predetermined cycles, wherein a cooled cooling pad arrangement T7 can consequently be placed on print head 100. Cooling pad arrangement T7 acts in this case in the form of passive cooling.

Cooling pad arrangement T7 can nevertheless also be embodied for a cooling fluid to flow through it at least temporarily continuously and for this purpose, similar to the situation shown e.g. in FIG. 2, be connected to a cooling and/or heat exchanger apparatus T4 and a pump T3 by means of a loop. Cooling pad arrangement T7 acts in this case in the form of active cooling.

Figure 6:
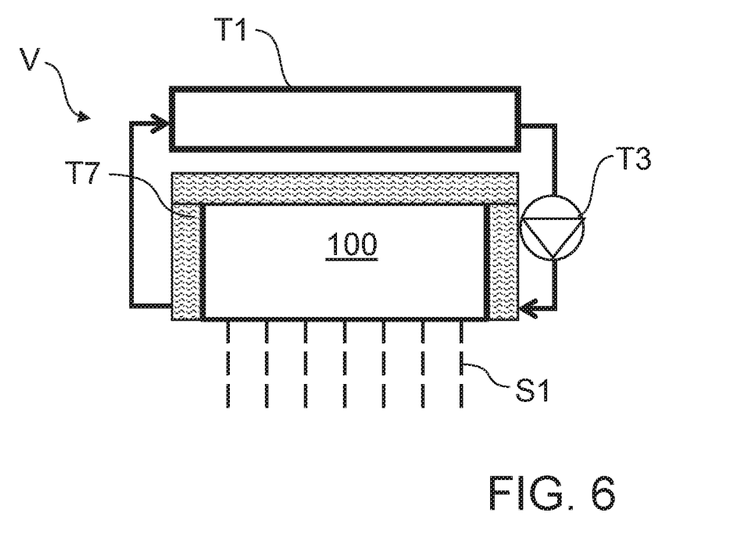
FIG. 6 shows a schematic view of an application device according to another example of the disclosure.

FIG. 6 shows a schematic view of an application device V with a print head 100 according to another example of the disclosure.

Print head 100 and temperature control apparatus of FIG. 6 can be of the same structure as shown in FIGS. 1 and 3 so that heating of the application medium is brought about in order to reduce heating of drive A during application of the application medium.

Print head 100 can furthermore be provided with a cooling pad arrangement T7, as shown in FIG. 6, so that cooling of drive A is brought about in order to reduce heating of drive A during application of the application medium.

FIG. 7 shows a schematic view of a print head 100 according to one example of the disclosure.

Print head 100 serves to generate a coherent application medium jet S2, to which end coil 6 holds valve element 9 permanently in the opening position.

Figure 9:
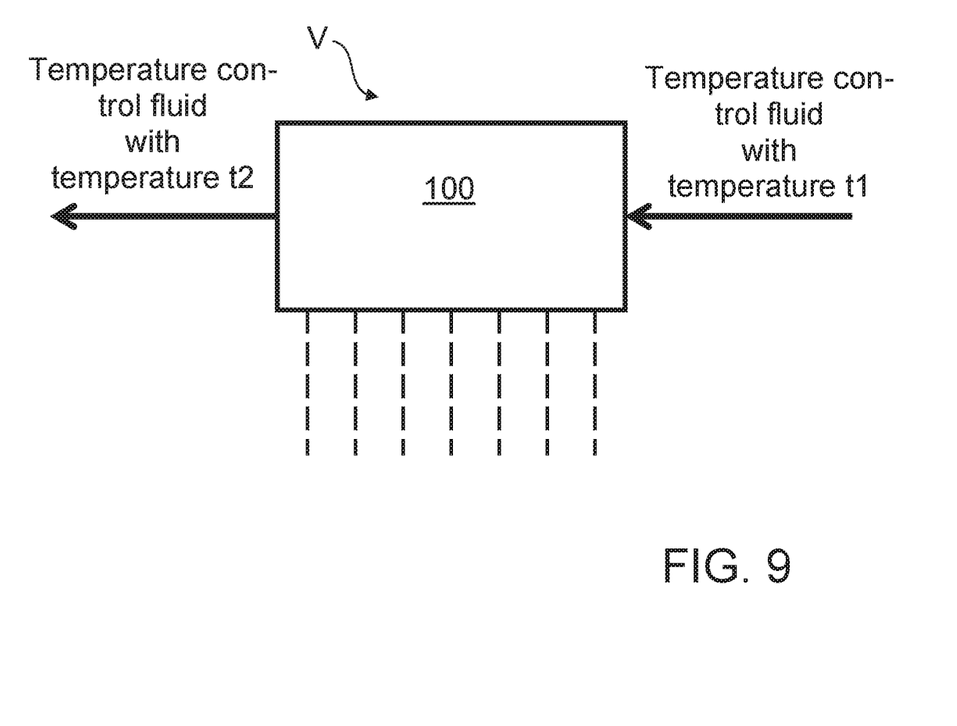
FIG. 9 shows a schematic representation of temperature control according to one example of the disclosure.

FIG. 9 shows a schematic view of a print head 100 according to another example of the disclosure.

Print head 100 serves to generate a droplet jet S1, to which end coil 6 and restoring element 10 ensure that valve element 9 is moved to and fro between the opening position and the closing position with high frequency.

Figure 8:
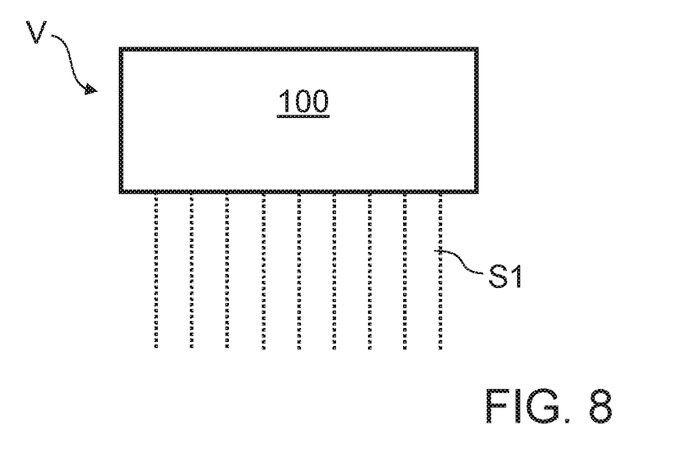

Droplet jets S1 shown in FIG. 8 have substantially spherical droplets, whereas droplet jets S1 shown in FIGS. 1, 2, 5 and 6 have droplets which can initially be elongated.

FIG. 9 serves to illustrate the possible principles of operation of the active, cooling fluid-based temperature control (cooling and/or heating) for the purpose of reducing heating of drive A during application of the application medium.

In the case of the heating-based variant (e.g. FIGS. 1 and 3), the temperature control fluid (heating fluid) upstream of print head 100 is warmer than downstream of print head 100 (t1 greater than t2).

In the case of the cooling-based variant (e.g. FIGS. 2 and 4), the temperature control fluid (cooling fluid) upstream of print head 100 is colder than downstream of print head 100 (t1 less than t2).

Alternatively or additionally to the examples described with reference to FIGS. 1 to 9, print head 100 can be provided in a targeted manner with a temperature control apparatus (not shown) formed as a heat-conducting construction composed of highly heat-conductive material, e.g. aluminium or copper, for the purpose of reducing heating of drive A during application of the application medium.

The heat-conducting construction can be formed and arranged in order to discharge heat generated by drive A.

The heat-conducting construction can alternatively or additionally be formed and arranged in order to conduct heat generated by temperature control apparatus T1, T2, T3 effectively to the application medium. E.g. nozzle plate 1 and/or plate 4 can this be formed as the heat-conducting construction.

The heat-conducting construction can alternatively or additionally be formed and arranged in order to conduct cold generated by temperature control apparatus T3, T4, T5, T6 effectively to drive A and/or around drive A.

The heat-conducting construction can include heat-conducting sheet plates and/or heat-conducting ribs. The heat-conducting construction can also include a heat-conducting function block in which preferably all drives A, in particular preferably all coils 6, of print head 100 can be accommodated.

The heat-conducting construction can extend e.g. in sections on the outside of print head 100 and in sections inside print head 100 so that heat/cold can be conducted from the interior of print head 100 to the outside or vice versa. The heat-conducting construction can nevertheless also extend substantially entirely in the interior of print head 100, e.g. in the case in which the heat-conducting construction is supposed to pass on heat/cold of the temperature control fluid. In this case, as already mentioned above, in particular nozzle plate 1 and/or plate 4 can be formed from heat-conductive material and thus form a heat-conducting construction.

Figure 10:
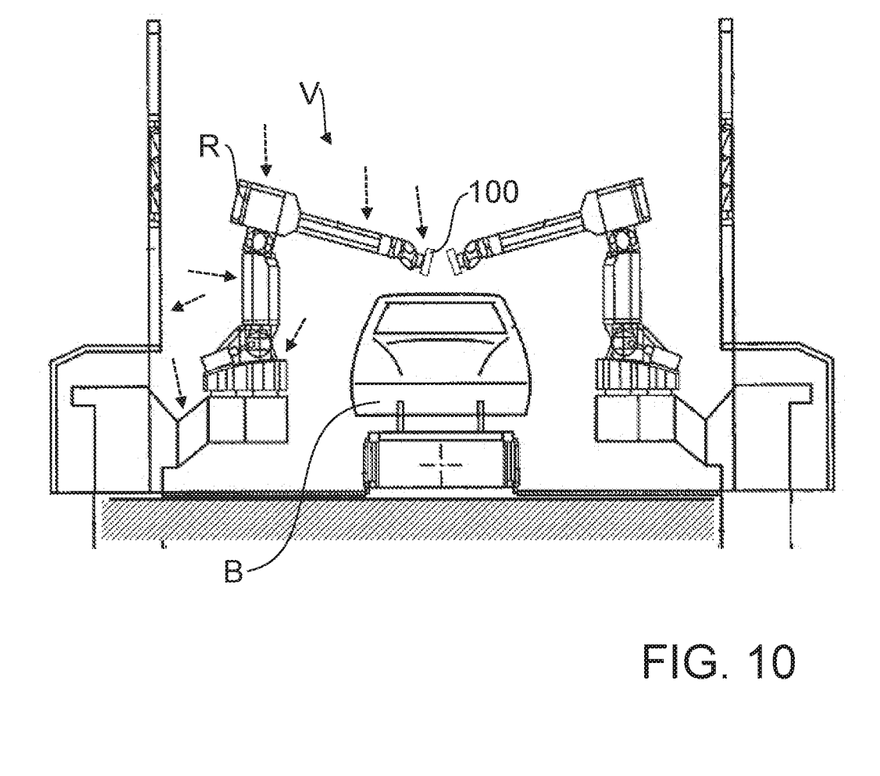
FIG. 10 shows a view of two application robots with an application device according to one example of the disclosure.

FIG. 10 shows a view of two application robots R for the application of an application medium onto a component B in the form of a motor vehicle body, with an application device V according to one example of the disclosure. For the sake of clarity, only the left-hand application robot is provided with reference numbers in FIG. 10.

Application robot R serves to guide at least one print head 100 and expediently has at least five or at least six movable robot axes.

The dashed arrows show by way of example mounting points for the arrangement of individual components of the temperature control apparatuses described herein, in particular of heating apparatus T1, pump T3, cooler and/or heat exchanger apparatus T4 and/or one or more of temperature control fluid lines T2, T5, T6. In this case, the individual components can, at least in sections, be arranged inside or outside the shown mounting points (e.g. robot housing, robot base, robot arm and/or print head 100).

Several print heads can be supplied with at least one central temperature control apparatus. The temperature control fluid can be supplied directly to each print head and flow directly back to the temperature control apparatus. It can, however, also flow through several print heads connected in series.

Heating apparatus T1, pump T3, and/or cooler and/or heat exchanger apparatus T4 can also be arranged spaced apart from application robot R, e.g. on a painting booth wall or a robot support structure (e.g. support console or support frame), wherein the connection to print head 100 can be carried out via one or more of temperature control fluid lines T2, T5, T6 which can in turn run in or along application robot R.

The disclosure is not restricted to the preferred exemplary examples described above. On the contrary, a plurality of variants and modifications are possible which also make use of the concept of the disclosure and therefore fall into the scope of protection. The disclosure therefore includes various aspects of the disclosure which enjoy protection independently of one another.

The invention claimed is:

1. An application device for application of an application medium onto a component, comprising:
   a print head for application of the application medium, wherein the print head has:
   a nozzle plate,
   at least one nozzle in the nozzle plate for discharge of the application medium,
   at least one valve element, which is movable relative to the nozzle plate, for control of the application medium discharge through the at least one nozzle, wherein the at least one movable valve element closes the at least one nozzle in a closing position and releases it in an opening position,
   at least one drive for moving the at least one valve element,
   the application device comprises at least one temperature control apparatus having a temperature control fluid line with a first subsection that extends through the print head and a second subsection that extends along an outside of the print head,
   wherein the first subsection reduces a heating of the at least one drive and the second subsection cools the print head from the outside during the application of the application medium, and
   the least one temperature control apparatus comprises a heating apparatus for heating the application medium and thus for reducing the viscosity of the application medium, the heating apparatus includes a second temperature control fluid line that leads through the print head.

2. The application device according to claim 1, characterised in that the heating apparatus serves to heat a temperature control fluid and the temperature control fluid thus represents a heating fluid for heating the application medium.

3. The application device according to claim 1, characterised in that the at least one temperature control apparatus comprises a cooler or heat exchanger apparatus for cooling the at least one drive.

4. The application device according to claim 3, characterised in that the cooler or heat exchanger apparatus serves to cool a temperature control fluid and the temperature control fluid thus represents a cooling fluid for cooling the at least one drive.

5. The application device according to claim 2, characterised in that
   a) the application medium does not serve as a temperature control fluid, or
   b) the temperature control fluid is selected from:
      b1) a gas, in particular nitrogen, air, compressed air,
      b2) a liquid fluid, in particular water, in particular deionised water or distilled water,
      b3) a coolant,
      b4) a flushing medium, detergent or solvent, in particular heated, or
   c) the compressed air is removed directly from a central supply line.

6. The application device according to claim 1, characterised in that, in the print head, an application medium supply for the supply of the application medium runs to the at least one nozzle and the application medium supply is temperature controlled at least in sections by at least one temperature control apparatus.

7. The application device according to claim 6, characterised in that
   at least one temperature control fluid line for heating the application medium extends along the application medium supply, or
   at least one temperature control fluid line extends so that the temperature control fluid flows around the application medium supply, or
   the nozzle plate delimits the application medium supply in its longitudinal direction.

8. The application device according to claim 2, characterised in that at least one temperature control fluid line extends along the drive, or
   extends so that the temperature control fluid flows around the at least one drive.

9. The application device according to claim 2, characterised in that the temperature control fluid volumetric flow or the temperature thereof is/are controlled so that
   a service life of the drive is increased, a temperature in the print head lies below an ignition temperature of a solvent used in the coating media.

10. The application device according to claim 2, characterised in that the at least one temperature control apparatus comprises a pump for conveying the temperature control fluid.

11. The application device according to claim 1, characterised in that the at least one temperature control apparatus makes available passive temperature control or comprises a heat-conducting construction composed of heat-conductive material and the heat-conducting construction satisfies at least one of the following functions:
discharging heat generated by the at least one drive,
conducting heat generated by the at least one temperature control apparatus to the application medium,
conducting cold generated by the at least one temperature control apparatus to the drive.

12. The application device according to claim 11, characterised in that the heat-conducting construction comprises heat-conducting sheet plates or heat-conducting ribs.

13. The application device according to claim 11, characterised in that the heat-conducting construction comprises a heat-conducting function block and the at least one drive is positioned in the heat-conducting function block.

14. The application device according to claim 11, characterised in that the heat-conducting construction
extends at least in sections on the outside of the print head, or
is arranged at least in sections inside the print head, or
is arranged on the at least one drive, so that it spans the at least one drive in its circumferential direction, or
extends along an application medium supply in the print head.

15. The application device according to claim 11, characterised in that the heat-conductive material is selected from:
a metallic material,
copper,
aluminium.

16. The application device according to claim 1, characterised in that the at least one temperature control apparatus comprises a cooling pad arrangement for packing in of the print head at least in sections.

17. The application device according to claim 16, characterised in that the cooling pad arrangement is embodied for a cooling fluid to flow through at least temporarily continuously.

18. The application device according to claim 1, characterised in that a pump is mounted on the print head.

19. The application device according to claim 1, characterised in that the at least one drive
operates electromechanically, or
comprises an electric coil for activation of the valve element, wherein the at least one temperature control apparatus serves to reduce heating of the coil during application of the application medium, or
comprises a restoring element for activating the valve element.

20. The application device according to claim 19, characterised in that the valve element is displaced as a function of the energisation of the coil.

21. The application device according to claim 19, characterised in that the temperature control apparatus serves to reduce a heating of the coil of the at least one drive.

22. The application device according to claim 19, characterised in that, in order to generate a droplet jet, the coil and an elastic restoring element ensure that the valve element is moved to and fro between the opening position and the closing position.

23. The application device according to claim 1, characterised in that, in order to generate a coherent application medium jet, a coil holds the valve element in the opening position and an elastic restoring element moves the valve element in idle phases into the closing position.

24. The application device according to claim 1, characterised in that the application medium is a paint.

25. The application device according to claim 1, characterised in that
the at least one temperature control apparatus is part of a loop, or
the at least one temperature control apparatus performs temperature control for the at least one drive during application of the application medium to a temperature of below 80° C.

* * * * *